(12) United States Patent
Weinmann

(10) Patent No.: US 6,505,369 B1
(45) Date of Patent: Jan. 14, 2003

(54) METHOD OF MEASURING THE LOADING OF A WASHING DRUM

(75) Inventor: Martin Weinmann, Bad Waldsee (DE)

(73) Assignee: Diehl AKO Stiftung & Co. KG, Wangen (DE)

( * ) Notice: Subject to any disclaimer, the term of this patent is extended or adjusted under 35 U.S.C. 154(b) by 201 days.

(21) Appl. No.: 09/596,999

(22) Filed: Jun. 20, 2000

(30) Foreign Application Priority Data

Jun. 23, 2000 (DE) .......................................... 199 28 657

(51) Int. Cl.⁷ .............................................. D06F 33/02
(52) U.S. Cl. .................... 8/159; 68/12.02; 68/12.01; 68/12.12
(58) Field of Search ................... 8/159, 158; 68/12.04, 68/12.12, 12.01, 12.02, 24

(56) References Cited

U.S. PATENT DOCUMENTS

| | | | |
|---|---|---|---|
| 5,507,054 A | * | 4/1996 | Blauert et al. |
| 5,507,055 A | * | 4/1996 | Blauert et al. |
| 5,561,991 A | * | 10/1996 | Berkcan et al. |
| 5,577,283 A | * | 11/1996 | Badami et al. |
| 5,669,250 A | * | 9/1997 | Dausch et al. |
| 5,765,402 A | * | 6/1998 | Ikeda et al. |
| 6,029,298 A | * | 2/2000 | Dausch et al. |

FOREIGN PATENT DOCUMENTS

| | | |
|---|---|---|
| DE | 3416638 A1 | 11/1985 |
| DE | 4038178 A1 | 6/1992 |
| DE | 4431846 A1 | 3/1996 |

\* cited by examiner

*Primary Examiner*—Frankie L. Stinson
(74) *Attorney, Agent, or Firm*—Scully, Scott, Murphy & Presser

(57) ABSTRACT

In a method of measuring the loading of a washing drum 1, drivable by a motor 2, of a washing machine or a washer-drier, in a first phase A the washing drum 1 is accelerated by way of an electronic control system 3 to a first speed of rotation nb which is above the laundry-application speed of rotation na. In order to provide that removal of water from the laundry and machine friction are involved in the measurement result to the minimum possible degree, in a subsequent second phase B the washing drum 1 is braked to a second speed of rotation nc by electrical braking of the motor 2. The electronic control system 3 detects the variation in the braking procedure in regard to speed of rotation and/or braking moment to ascertain the mass moment of inertia of the loaded washing drum.

13 Claims, 2 Drawing Sheets

METHOD OF MEASURING THE LOADING OF A WASHING DRUM

BACKGROUND OF THE INVENTION

1. Field of the Invention

The invention concerns a method of measuring the loading of a washing drum of a washing machine or a washer-drier.

In order to optimise the washing or drying procedure, it is advantageous if the electronic control system of the washing machine or the washer-drier detects the respective loading of the washing drum. For it is then possible for procedural parameters such as water filling, supply of washing agent, speeds of rotation and timed switching operations to be matched to the respective loading. That makes it possible to achieve savings, with optimum washing results.

When the washing drum is rotating, frictional phenomena occur in the drum suspension system and the friction dampers, by virtue of a possible unbalance in terms of laundry distribution. Besides bearing friction, additional coefficients of friction also occur as a consequence of the formation of foam or other influences, for example age-induced wear phenomena. Those phenomena are referred to as "machine friction". The machine friction can fluctuate greatly from one machine to another and under the effect of ageing. If machine friction is used to measure the drum loading, it is then to be reckoned that the measurement results will be inaccurate.

2. Discussion of the Prior Art

DE 44 31 846 A1 describes a method of the kind set forth in the opening part of this specification, in which machine friction is not to have a substantial effect on drum loading measurement. In the case of a loaded washing drum which is rotating at least at the speed causing the laundry to bear against the drum surface, the torque to be applied to maintain a constant speed of rotation by the motor of the washing drum is firstly measured. Then, the torque which occurs upon acceleration of the washing drum is ascertained. On the basis of those two torque values, the electronic control system determines the loading of the washing drum and forms a control parameter for further control of the washing machine or the washer-drier. Water is inevitably removed from the laundry during the procedures for measuring the torque at a constant speed of rotation and during measurement of the torque in the acceleration phase, and that has the consequence that the moments of inertia change during the measurement procedure. That adversely influences the measurement result. In addition, the gradient of the increase in speed of rotation in the acceleration measurement phase must be limited in an upward direction, with wet laundry, because, if the increase in speed of rotation is excessively fast, water is removed from the laundry so rapidly that in addition frictional torques which negatively influence the measurement would occur.

DE 34 16 639 A1 describes a method of controlling the spin program of a washing machine. An acceleration phase which is predetermined in the spin program involves measurement of the unbalance and the time required for the acceleration range. In this case also the above-indicated measurement inaccuracies occur.

DE 40 38 178 A1 describes a method of unbalance measurement. The mass inertia of the washing drum is measured during a slowing-down phase of the washing drum. During the slowing-down phase, only the machine friction which, as stated above, can fluctuate greatly from one machine to another and due to the effects of ageing acts so that it is scarcely possible to deduce an accurate value for the loading of the washing drum, from the variation in the speed of rotation in the slowing-down phase.

SUMMARY OF THE INVENTION

The object of the invention is to provide a method of the kind set forth in the opening part of this specification, which affords measurement results that are as accurate as possible, in particular by virtue of the fact that the removal of water from the laundry and machine friction are involved in the measurement result to the minimum possible degree.

In accordance with the invention that object is attained by the features of the characterising portion of claim 1.

In this procedure measurement is implemented while the washing drum is being actively braked by the motor. No substantial removal of water from the laundry occurs in the phase involving deceleration of the washing drum so that the water-removal effect which can only be defined with difficulty also has no action on the measurement result. As the measurement procedure is based on active braking of the motor with a detectable braking moment, the machine friction which is governed by loading and which varies from one machine to another and which is affected by ageing phenomena does not have a substantial effect on measurement. Preferably in this case the braking moment applied by electrical braking of the motor is substantially greater than the moment of the machine friction.

BRIEF DESCRIPTION OF THE DRAWINGS

Advantageous configurations of the invention are set forth in the and the description hereinafter of two embodiments as shown in FIGS. 2 and 2a. In the drawing.

DETAILED DESCRIPTION OF PREFERRED EMBODIMENTS

Figure 1:
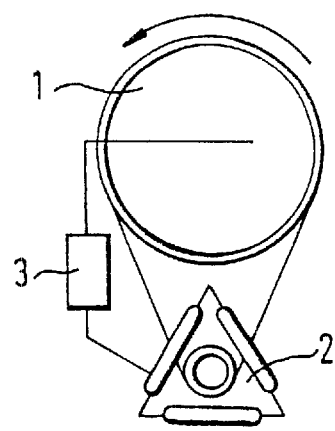
FIG. 1 diagrammatically shows a washing machine.

A washing machine or a washer-drier has a washing or laundry drum 1 which is drivable by an electric motor 2. An electronic control system 3 detects the operating conditions of the washing drum 1 and/or the motor 2 and controls the braking of the motor 2.

In a first phase A (acceleration phase) the washing drum 1 is accelerated to a first speed of rotation nb which is markedly above the laundry-application speed na, wherein the laundry-application speed na is that speed of rotation at which the laundry bears against the inside peripheral surface of the washing drum 1 under the effect of centrifugal force, without dropping down.

When the first predetermined speed of rotation nb is reached, then in a second phase B (braking phase) the motor 2 and therewith the washing drum 1 are positively braked by electrical measures. Braking is preferably effected in the counter-current mode without additional components such as braking resistors and so forth. In the case of a mechanically switched motor that specific controlled braking action (braking phase B) can be implemented by a suitable circuit by virtue of current being passed through its field winding or armature winding in the opposite direction. A synchronous motor or an electronically switched dc motor can be positively braked by the motor terminals being short-circuited at least from time to time. In the case of an asynchronous motor braking is effected with a slip S>1. Braking is effected to a second speed of rotation nc which is above the laundry-application speed na.

The braking torque Mb exerted by the motor 2 is preferably so selected that it is a multiple greater than the moment of friction of the machine (machine friction) which occurs when the washing drum 1 slows down without active braking. The moment of friction is therefore scarcely involved in the measurement result.

The electronic control system 3 ascertains the rotary speed gradient w', that is to say the negative angular acceleration of the washing drum 1 which occurs in the braking phase B and calculates from same and from the braking moment Mb the mass moment of inertia J of the rotating masses with respect to the axis of rotation of the washing drum 1, in accordance with the following equation:

$$J = Mb/w'.$$

The mass moment of inertia J increases substantially proportionally with the respective loading of the washing drum 1. In accordance with the respectively ascertained mass moment of inertia J or the respective loading, the electronic control system 3 can match parameters which are relevant for the washing or rinsing process such as spin speed, level of water, supply of washing agent and so forth, to the respective loading involved.

To optimise the spin operation, any unbalance can be ascertained in a third phase C in which the speed of rotation nc is kept constant, by measurement of the deflection of the washing drum 1, and the unbalance mass is determined having regard to the respective mass moment of inertia J. Correspondingly then, in a fourth phase D the machine will go to the spin speed which is optimum at the respective loading and unbalance.

Figure 2:
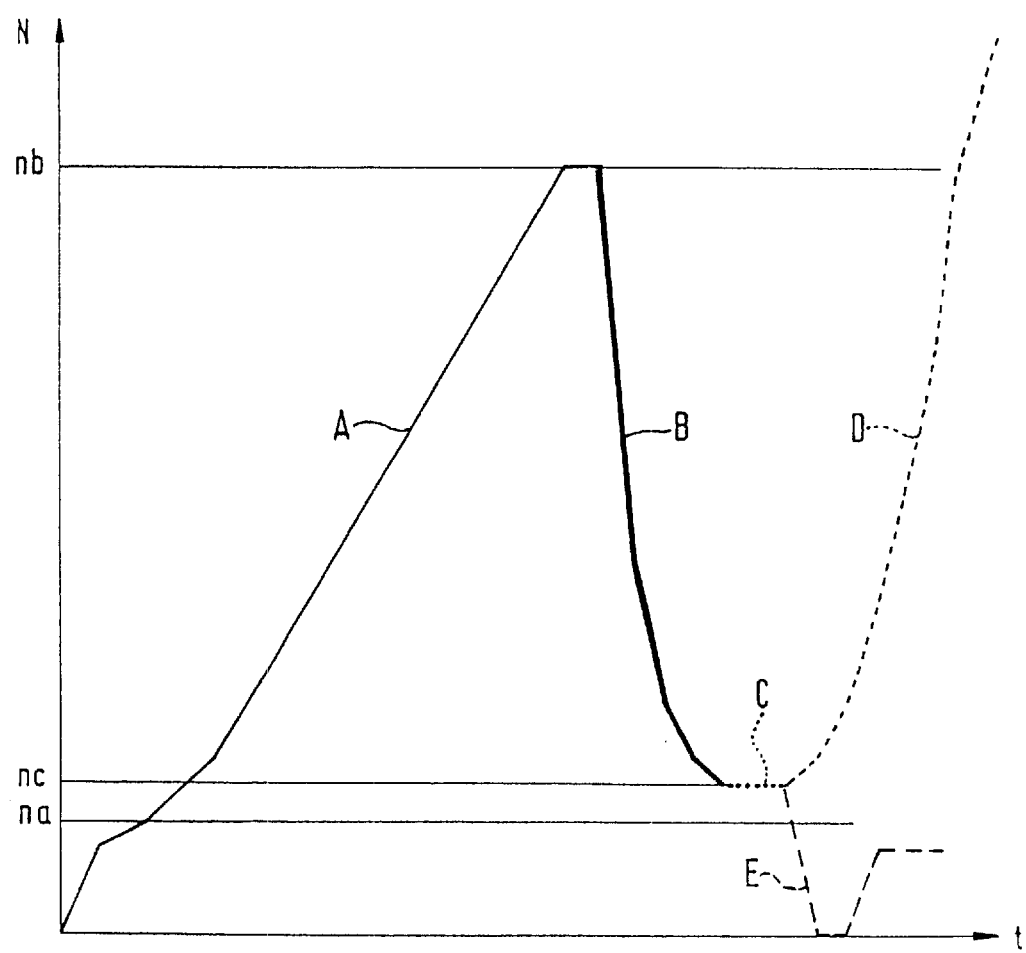
FIG. 2 shows a variation in speed of rotation for ascertaining the respective loading of the washing drum.

The method can also be used in relation to dry laundry, to optimise the washing procedure. Then the relevant parameters for the washing operation such as level of water, supply of washing agent, the timing ratio with which the motor 2 is switched on and off are optimised, as is shown as a phase E in FIG. 2.

Deceleration in the phase B can be implemented at a constant braking torque, in which case the braking torque is then known to the electronic control system 3 and it ascertains the rotary speed gradient or the negative angular acceleration in the braking phase.

It can also be provided that the braking effect in the phase B is effected in accordance with a predetermined rotary speed pattern and then the mass moment of inertia and therewith the loading of the washing drum 1 are ascertained by the electronic control system 3 from the braking energy which is required for same.

The negative rotary speed gradient or the negative angular acceleration in the braking phase B is limited on the one hand by the braking capacity of the motor 2. On the other hand it is limited by the requirement that the tangential acceleration forces acting on the laundry at the periphery of the washing drum 1 should not exceed the tangential forces, by virtue of the static friction of the laundry in the drum, so that the laundry remains in a condition of bearing against the laundry drum while it rotates. The aim therefore is to prevent the laundry from being displaced in the washing drum due to excessively high acceleration forces. In that respect, the tangential acceleration forces Fa acting on the laundry should be less than the tangential forces Fr on the laundry by virtue of the static friction thereof.

The tangential acceleration forces Fa are determined on the basis of the following formula:

$$Fa = m \times w' \times r,$$

wherein m denotes the mass of the laundry, w' denotes the angular acceleration of the washing drum around the axis of rotation and r is the spacing of the laundry relative to the drum axis. The frictional forces Fr of the laundry against the drum periphery arise on the basis of the following formula:

$$Fr = kr \times (Fz - Fg),$$

wherein $Fz = m \times w^2 \times r$ and $Fg = m \times g$ wherein Fr is the frictional force of the laundry against the drum periphery in the tangential direction, Fz is the centrifugal force acting on the laundry in the radial direction towards the drum periphery, Fg is the gravitational force acting on the laundry, kr is the coefficient of friction for the laundry to cling to the drum periphery, m is the mass of the laundry, w is the angular speed of the washing drum, r is the spacing of the washing drum axis of rotation and g is acceleration due to gravity.

With the requirement Fa<Fr the maximum permissible rotary speed gradient w' becomes:

$$w' < kr \; (W^2 - g/r).$$

It will be apparent therefrom that the rotary speed gradient increases or decreases with the square of the rotary speed. It is preferably provided that the washing drum 1 is braked in accordance with that function. That gives the shortest possible measurement duration with the maximum permissible braking torque and thus the minimum possible influence of machine friction on the measurement result.

Figure 2A:
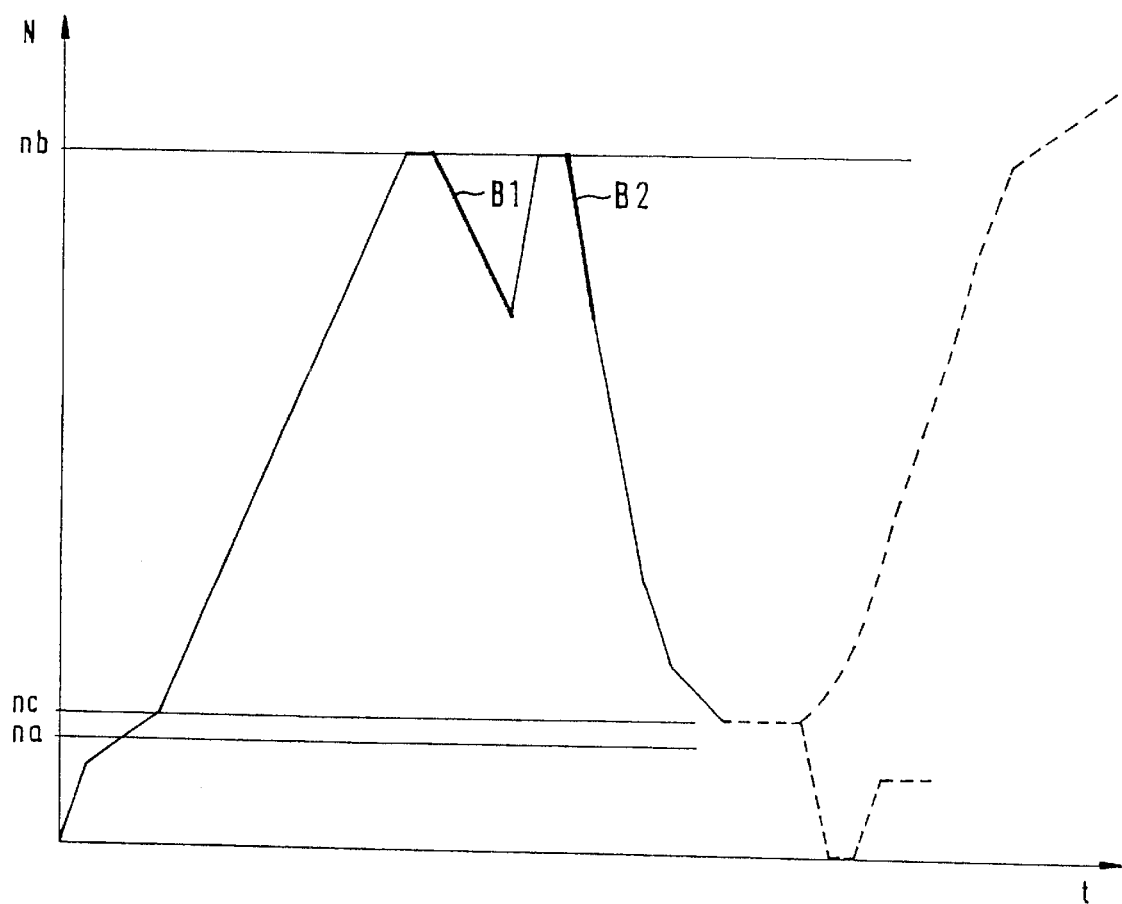
FIG. 2a shows a variation in speed of rotation in which the influence of machine friction on drum loading measurement is to be completely eliminated.

If a particularly accurate loading measurement is necessary or if the braking torque of the drive is not substantially higher than the moment of machine friction, the influence of machine friction on the measurement result can be completely eliminated with an alternative configuration as shown in FIG. 2a. At the time B1 in FIG. 2a the drum is slowing down without involving motor braking. The control system calculates the rotary speed gradient $W'_{B1}$ on the basis of machine friction. At the time B2 in FIG. 2a the drum, in addition to the machine friction, is braked with a defined motor torque. That results in a rotary speed gradient $W'_{B2}$ which is greater than $W'_{B1}$. The mass moment of inertia and therewith the drum loading then result from the relationship:

$$J = \frac{Mb}{W'_{B2} - W'_{B1}}$$

wherein:
  J denotes the mass moment of inertia of the rotating parts, essentially the drum with load,
  Mb denotes the defined braking moment,
  $W'_{B1}$ denotes the angular acceleration with machine friction as the braking moment, and
  $W'_{B2}$ denotes the angular acceleration with machine friction plus defined motor braking moment.

What is claimed is:

1. A method of measuring a loading of a washing drum, drivable by a motor, of a washing machine or a washer-drier, wherein the washing drum (1) is accelerated in a first phase (A) to a first speed of rotation (nb) which is above the laundry-application speed of rotation (na), characterized in that in a subsequent second active braking phase (B) immediately following first phase (A), the washing drum (1) is braked by electrical braking of the motor (2) to a second speed of rotation (nc) and that the mass moment of inertia (J) of the loaded washing drum (1) is ascertained by an electronic control system (3) from a variation in measurable braking operation for determining a reduction in the speed of rotation and/or applied braking moment.

2. A method according to claim 1 characterised in that the mass moment of inertia (J) of the loaded washing drum (1) is ascertained from the applied braking moment (Mb) and the measured rotary speed gradient (w').

3. A method according to claim 2 characterised in that the braking moment (Mb) is kept constant in the second phase (B).

4. A method according to claim 1 characterised in that braking is effected in accordance with a predetermined variation in speed of rotation and that the mass moment of inertia (3) of the loaded washing drum (1) is ascertained from the braking moment (Mb) necessary therefor.

5. A method according to claim 4 characterised in that the braking moment (Mb) of the washing drum (1) is set proportionally to the square of the speed of drum rotation (W) by the electronic control system (3).

6. A method according to claim 1 characterised in that the second speed of rotation (nc) is above the laundry-application speed of rotation (na).

7. A method according to claim 1 characterised in that the braking moment is selected to be substantially greater than the frictional moment of the washing drum (1).

8. A method according to one claim 1 characterised in that the braking moment is produced by suitable feed to and/or connection of the terminals of the motor (2).

9. A method according to claim 8 characterised in that in the case of a mechanically switched motor (2) the braking moment is generated by current being passed in the opposite direction through the field winding or the armature winding of the motor.

10. A method according to claim 8 characterised in that in the case of a synchronous motor or an electrically switched dc motor the braking moment is generated by the terminals o f the motor (2) being short-circuited at least from time to time.

11. A method according to claim 8 characterised in that in the case of an asynchronous motor a feed in the opposite relationship to the direction of rotation is effected, and it is therefore operated with a slip S>1.

12. A method according to claim 1 characterised in that braking from the first higher speed of rotation (nb) to the second lower speed of rotation (nc) is effected more than once with a different braking moment in order to minimise the influence of machine friction on the measurement result, by the loading being derived from the different rotary speed gradients or different braking capacities in the two braking operations.

13. A method according to claim 12 characterised in that the drum is braked on the one hand without and on the other hand with motor braking from the higher speed of rotation (nb) to the lower speed of rotation (nc).

* * * * *